United States Patent
Welch et al.

(10) Patent No.: US 8,880,874 B2
(45) Date of Patent: Nov. 4, 2014

(54) AUTOMATED COMPUTER BIOMETRIC IDENTITY ASSURANCE

(71) Applicant: Biolution Identity Networks, LLC, Highland Park, IL (US)

(72) Inventors: Jeffrey Peter Welch, Libertyville, IL (US); Michael Thomas Foley, Libertyville, IL (US)

(73) Assignee: Biolution Identity Networks, LLC, Highland Park, IL (US)

( * ) Notice: Subject to any disclaimer, the term of this patent is extended or adjusted under 35 U.S.C. 154(b) by 47 days.

(21) Appl. No.: 13/848,790

(22) Filed: Mar. 22, 2013

(65) Prior Publication Data

US 2013/0254533 A1    Sep. 26, 2013

Related U.S. Application Data

(60) Provisional application No. 61/614,704, filed on Mar. 23, 2012.

(51) Int. Cl.
*H04L 29/06* (2006.01)
*G06F 21/32* (2013.01)

(52) U.S. Cl.
CPC ................................ *G06F 21/32* (2013.01)
USPC .......................................................... 713/155

(58) Field of Classification Search
CPC ....................................................... G06F 21/32
USPC .................................................................. 713/155
See application file for complete search history.

(56) References Cited

U.S. PATENT DOCUMENTS

| | | | |
|---|---|---|---|
| 6,035,398 A * | 3/2000 | Bjorn | 713/186 |
| 6,076,167 A * | 6/2000 | Borza | 726/5 |
| 6,697,947 B1 * | 2/2004 | Matyas et al. | 713/182 |
| 6,941,462 B1 * | 9/2005 | Tsukamura et al. | 713/186 |
| 2009/0031125 A1 * | 1/2009 | Bjorn | 713/155 |
| 2014/0115324 A1 * | 4/2014 | Buer | 713/155 |

* cited by examiner

*Primary Examiner* — Chau Le
(74) *Attorney, Agent, or Firm* — The Webb Law Firm

(57) ABSTRACT

In a method of biometric identity assurance, biometric data based on a biometric modality is stored in a memory of a first computer. The biometric data is converted into a biometric template which is transferred from the first computer memory to a memory of a second computer. The second computer determines an encryption key based on a combination of the biometric template with a biometric-hash file of the user. Multiple credential files previously distributed among multiple remote computers are assembled into a single user credential file at the second computer. The first computer receives the encryption key and the user credential file from the second computer and accesses user credentials stored in the user credential file based on decryption of the user credential file using the encryption key. Via the thus accessed user credentials, the first computer uses or accesses one or more digital resources of the user.

5 Claims, 11 Drawing Sheets

105 - IDENTITY AND AUTHORIZATION EXCHANGE HUB

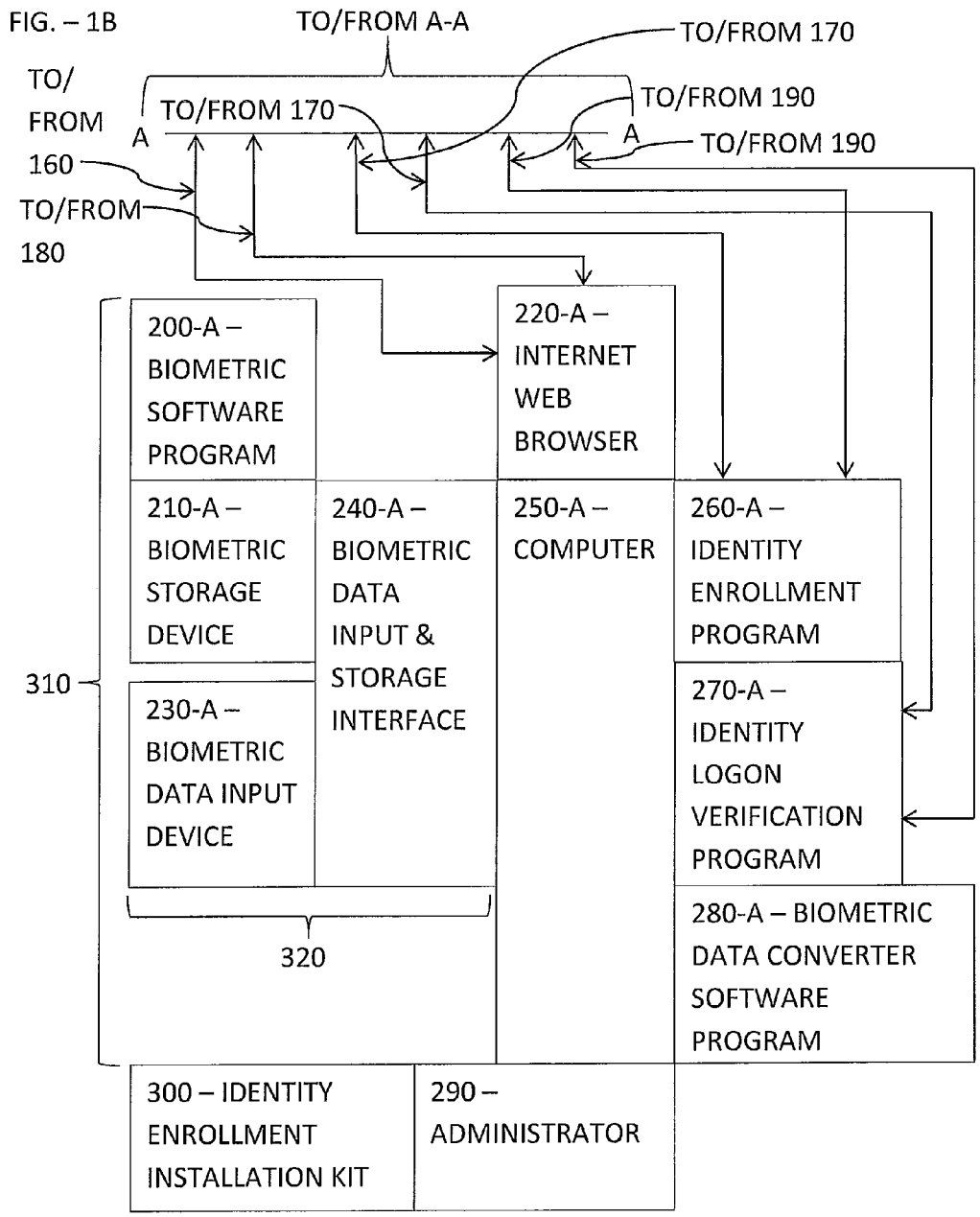

340 – USER COMPUTER SYSTEM    360 – MULTIPLE CREDENTIALING SERVERS

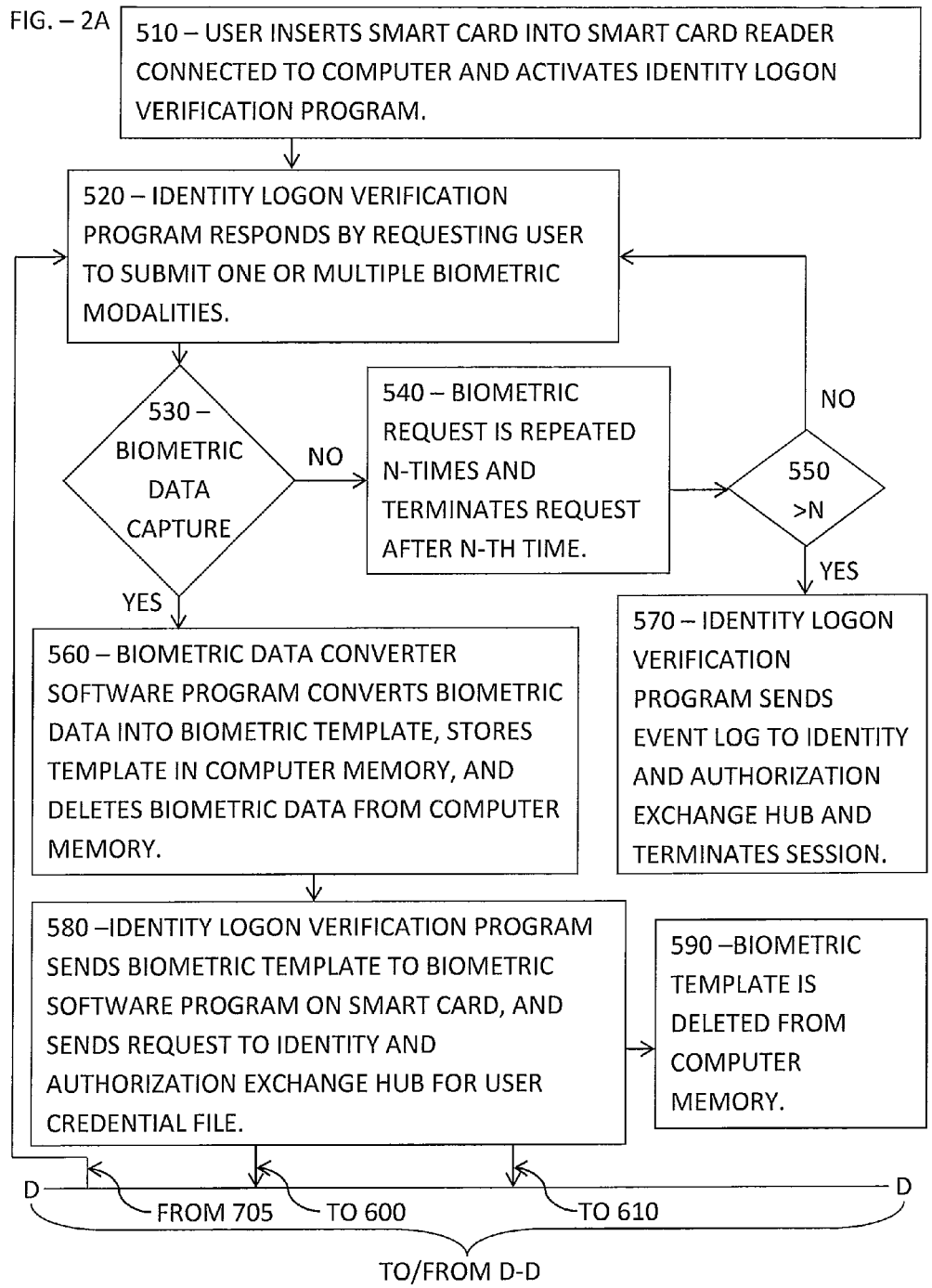

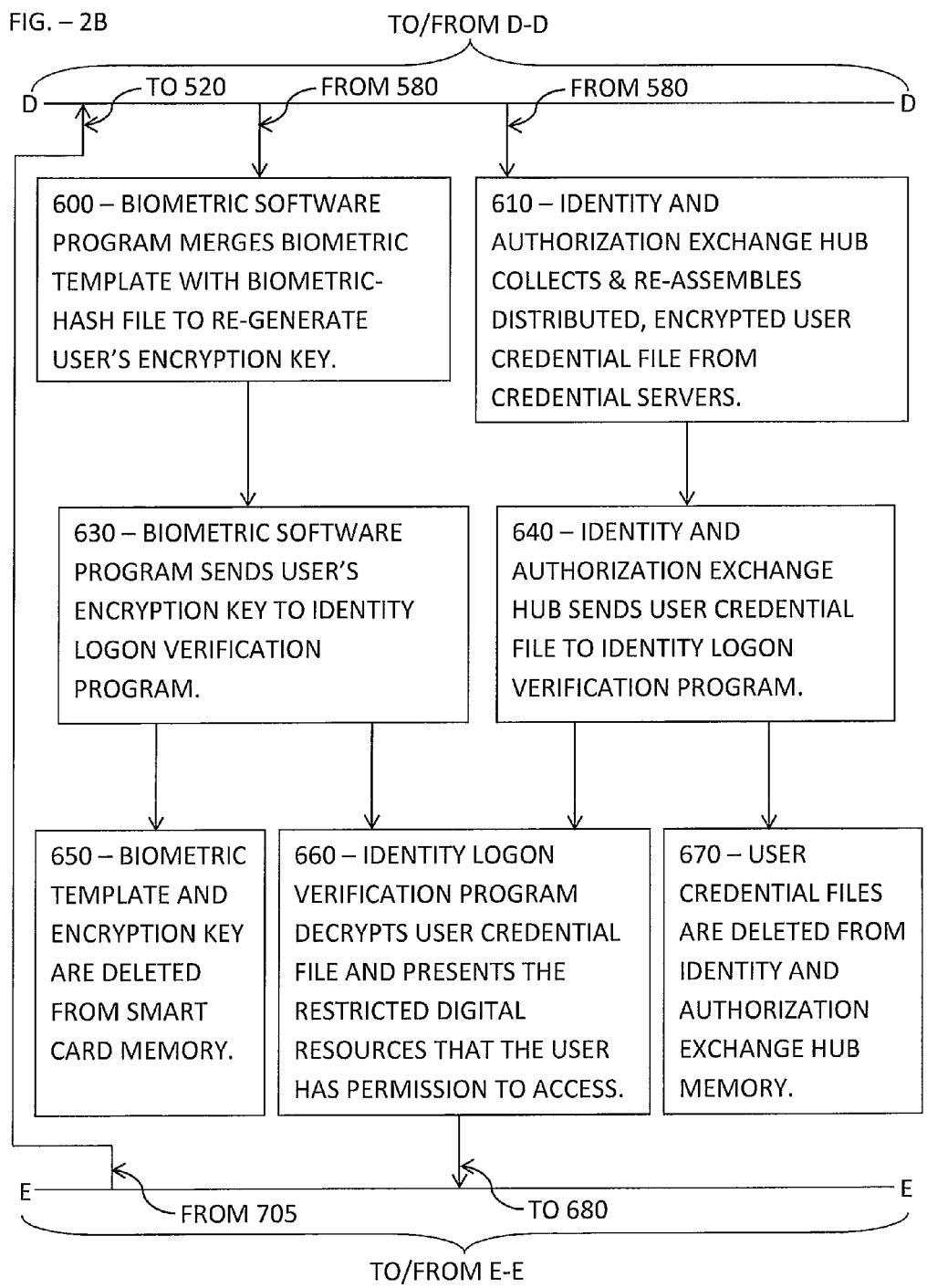

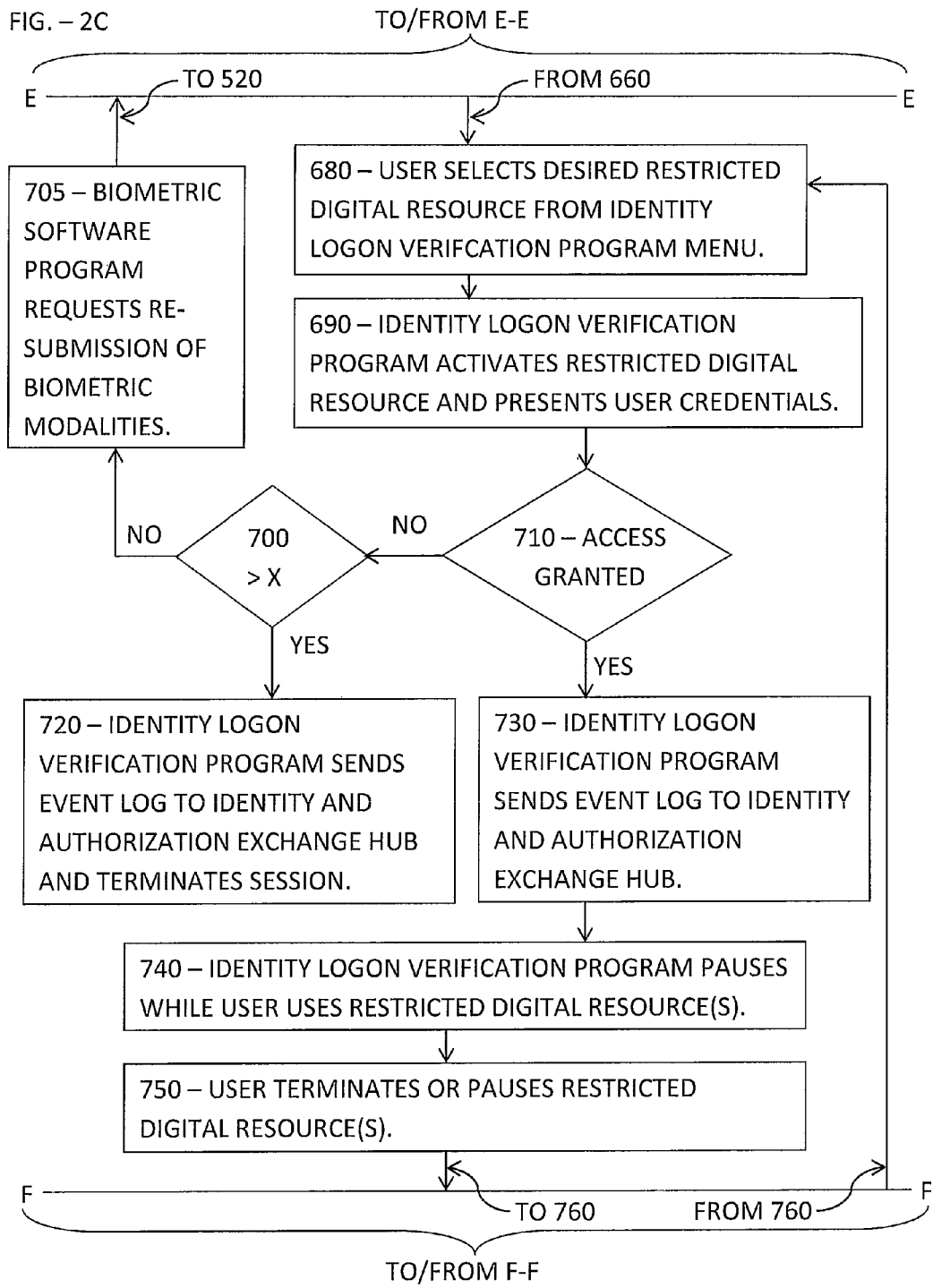

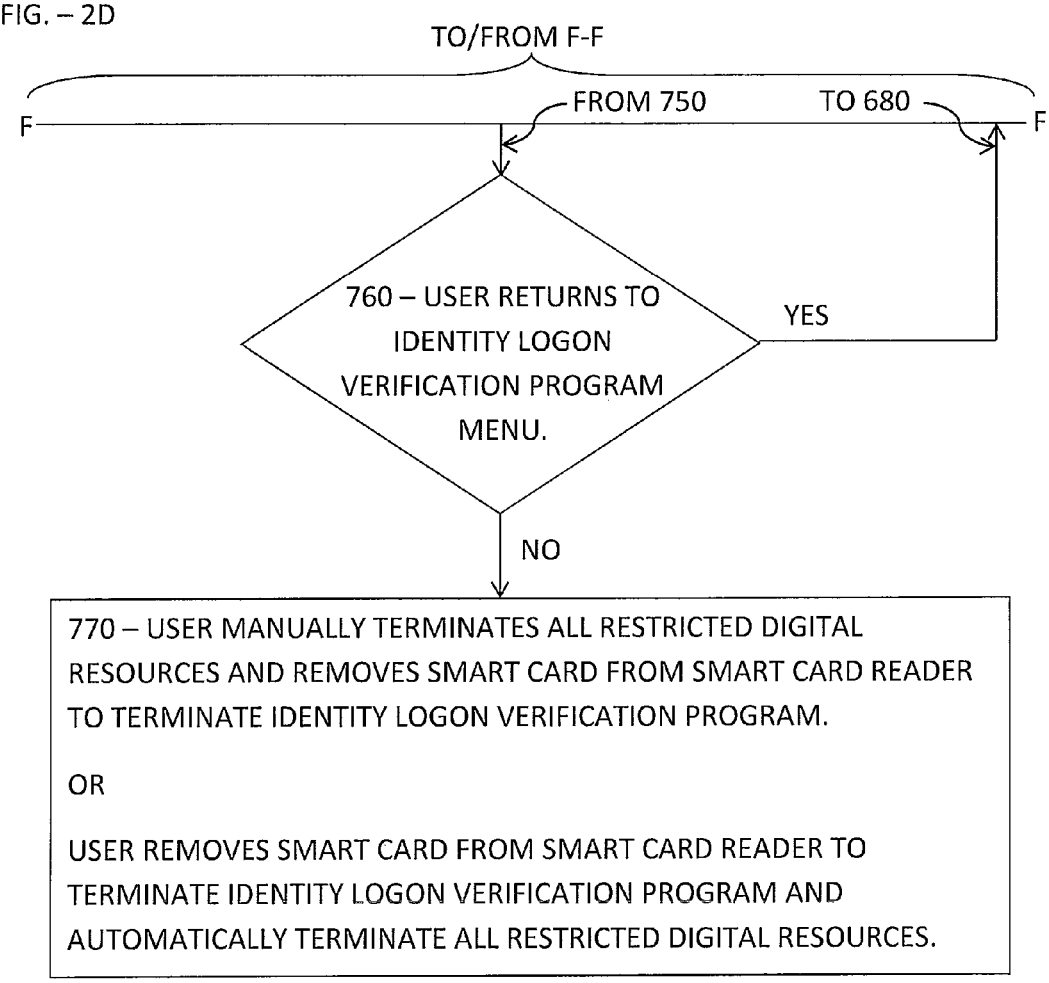

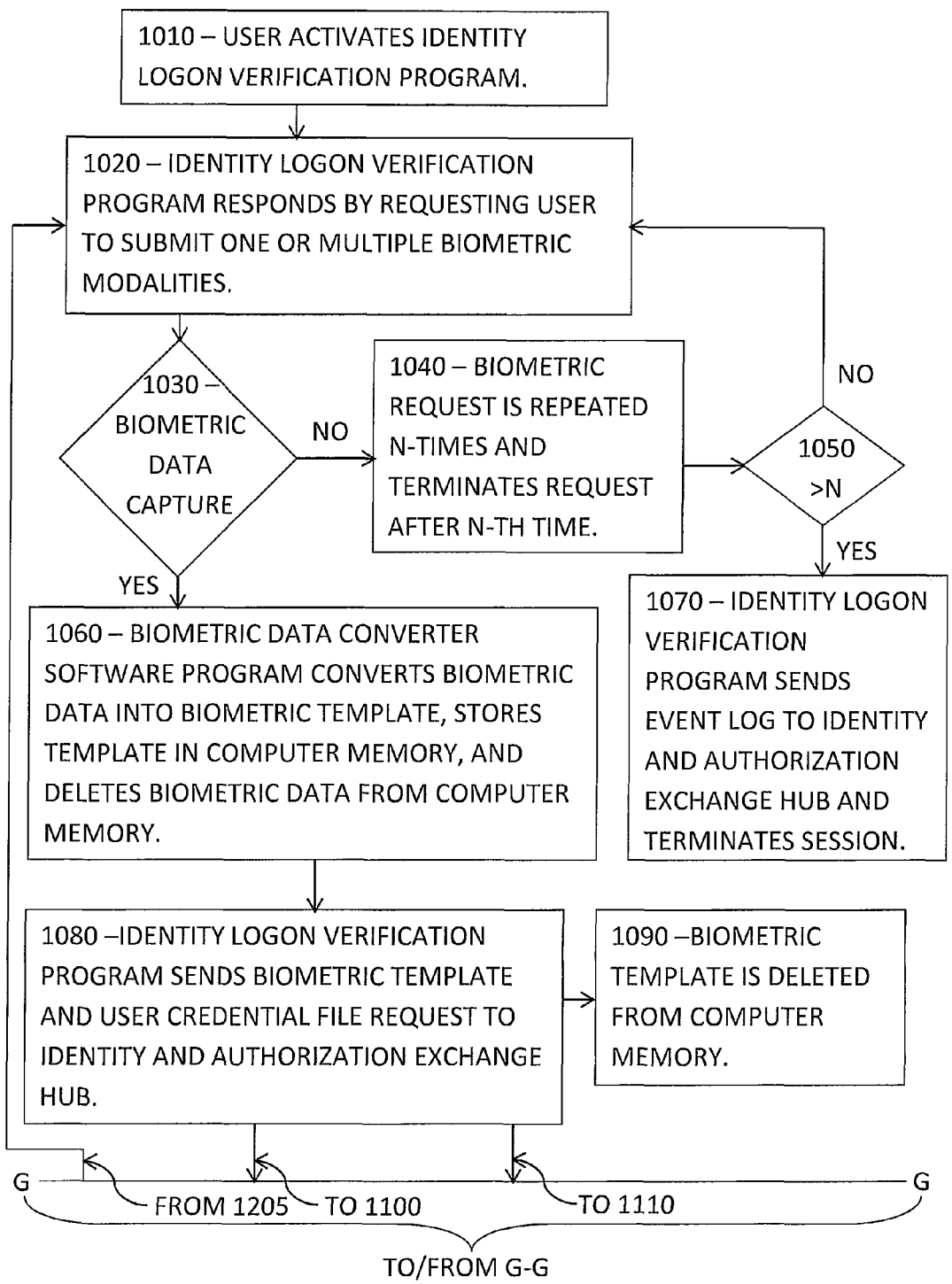

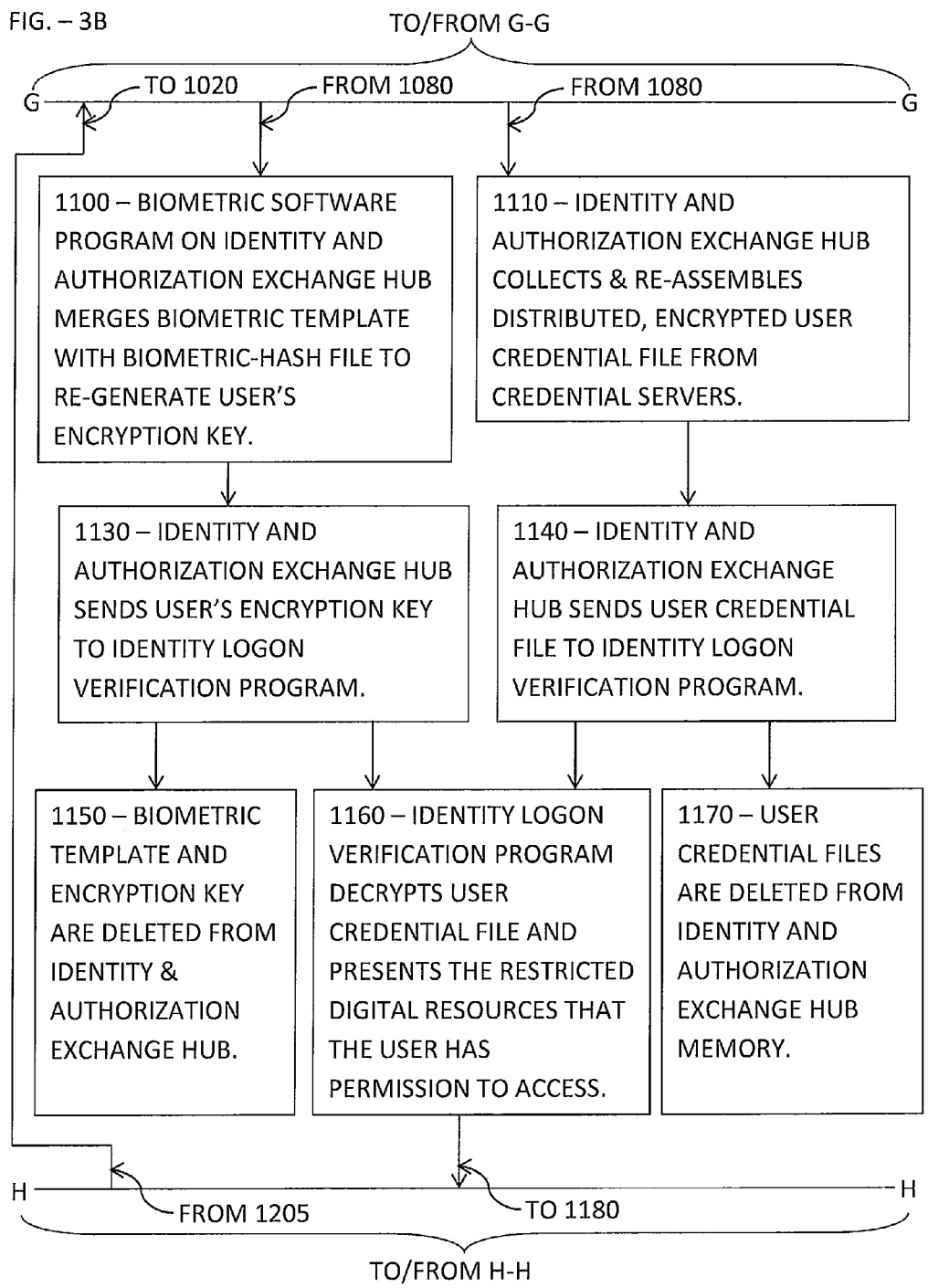

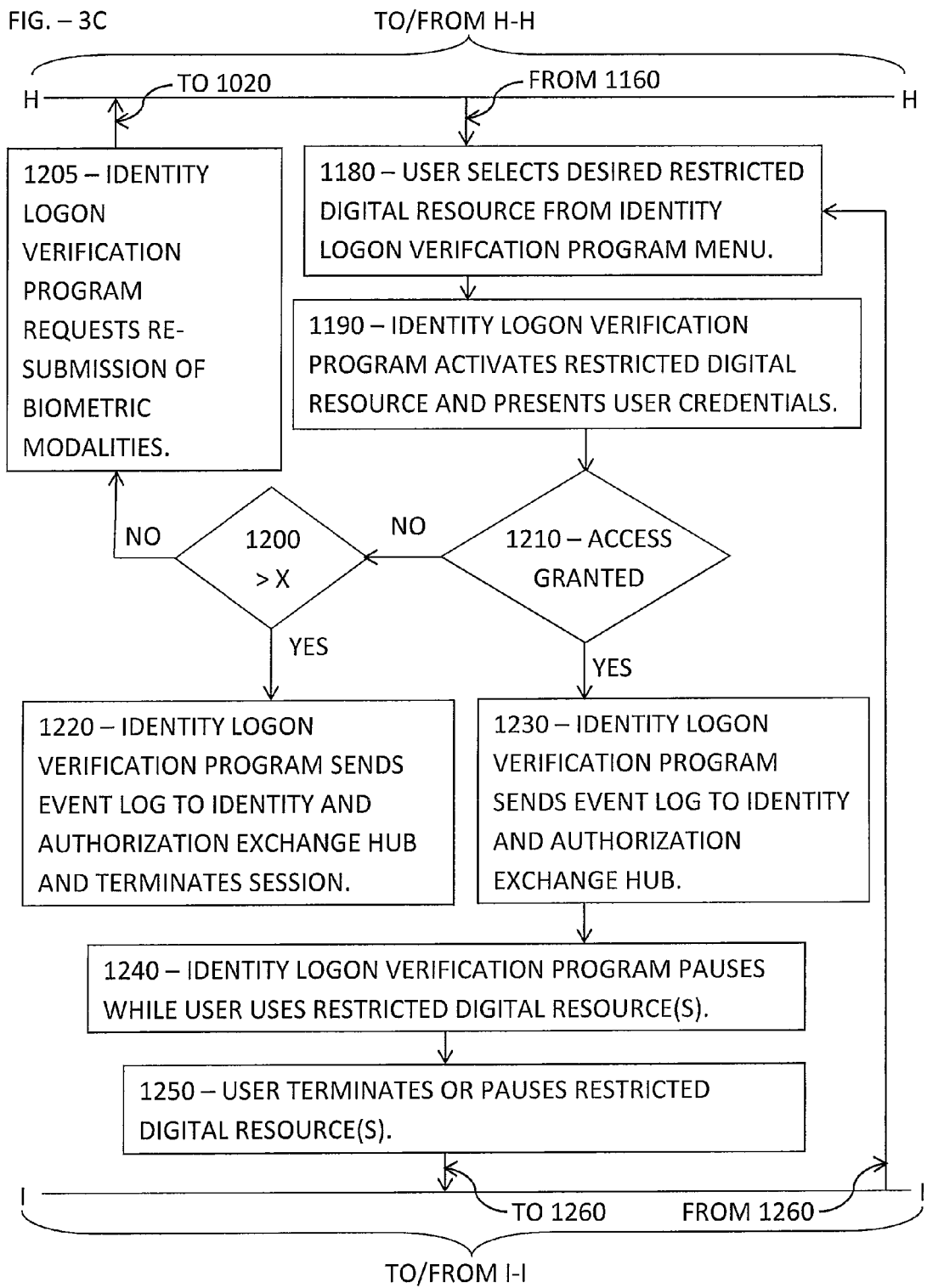

AUTOMATED COMPUTER BIOMETRIC IDENTITY ASSURANCE

CROSS REFERENCE TO RELATED APPLICATION

This application claims priority from U.S. Provisional Patent Application No. 61/614,704, filed Mar. 23, 2012, which is incorporated herein by reference.

BACKGROUND OF THE INVENTION

Traditional computer and database security is mostly comprised of antivirus and malware software, firewalls, sometimes encryption, and the problematic user name, password or personal identification number. Cybercrime succeeds when they steal an individual or companies log in credentials. Developed over 50 years ago, user name, password and personal identification number are no longer an adequate method to secure information or confidently identify an individual requesting access to protected information. As information migrates to the Internet, confidently determining who is really who and whether they are authorized to remotely access protected accounts becomes critical. Online, everyone is anonymous and, thus, liabilities are enormous.

SUMMARY OF THE INVENTION

This invention, the fully automated biometric identity assurance, privilege and credential management, and access control service (Identity Service) provides an innovative way to identify people in the virtual world by biometrically authenticating an individual in real time from any computing device and manages an individual or entire group's specific user credentials, privileges and permissions to all their restricted digital resources. Digital resources are the digital files and applications that are stored and used on computers and network servers and include, but are not limited to, document files, spreadsheet files, picture files, audio files, video files, word processing applications, spreadsheet applications, database applications, internet browser applications, websites, and web-based applications, etc. Restricted Digital Resources are the digital resources that have access controls where an individual must provide and present their credentials to be granted permission to use or access the resource. Credentials are the data that the individual must know or have in order to be granted permission to access the Restricted Digital Resources and can include, but is not limited to, user name, password, personal identification numbers, face, fingerprint, hand geometry, iris, signature, vascular, and voice, etc.

Biometric identification has been available to large government agencies for decades in the form of large, costly and classified databases. This invention combines this time tested identification method with the Identity and Authorization Exchange Hub, which is a collection of network server software programs that provide a complete set of services to implement the fully automated biometric identity assurance, privilege and credential management, and access control function. These software programs operate on a network server, able to communicate with other network servers and client computers using a secure cryptographic communications protocol, which provides numerous services including, but not limited to, system administration, user management, customer services, and credential management, etc.

Biometric identification is the method used to authenticate an individual's identity based on one or several of the individual's biometric modalities. A Biometric Modality is any measurable biological or behavioral characteristic used to uniquely identify an individual and includes, but is not limited to, face, fingerprint, hand geometry, iris, signature, vascular, and voice. The data collected or captured by a biometric modality measuring device is called the Biometric Data. An example of a Biometric Data file is the scanned image of an individual's fingerprint. A biometric modality measuring device includes, but is not limited to, cameras, scanners, touch screens, or microphones.

In order to allow for further processing, the Biometric Data is converted into a Biometric Template. For example, a Biometric Template for a fingerprint could be a two dimensional array indicating various spatial features of the fingerprint. The Biometric Template is used to create the Biometric-Hash File. The Biometric-Hash File is the data file constructed by combining the Biometric Template with the randomly generated User Encryption Key, used to encrypt the individual's credentials. The User Encryption Key is the random data string used to encrypt the User Credential File and is not permanently stored on any computer memory, internal or external.

More specifically, disclosed is a method of biometric identity assurance comprising: (a) storing in a memory of a first computer biometric data that is based on a biometric modality of a user acquired at a first time; (b) converting the biometric data of step (a) into a Biometric Template stored on the first computer memory; (c) receiving the Biometric Template in a memory of a second computer; (d) the second computer determining a first instance of a User Encryption Key based on a combination of the Biometric Template with a Biometric-Hash file of the user; (e) assembling multiple credential files that were previously distributed among multiple remote computers into a single User Credential File at the second computer, wherein each distributed credential file includes at least one credential of the user and the User Credential File includes multiple credentials of the user; (f) the first computer receiving the first instance of the User Encryption Key and the User Credential File from the second computer; (g) the first computer accessing user credentials stored in the User Credential File based on decryption of the User Credential File using the first instance of the User Encryption Key; and (h) the first computer using the user credentials accessed in step (g) to use or access one or more digital resources of the user.

Each digital resource can include one of the following: a document file, a spreadsheet file, a picture file, an audio file, a video file, a word processing application, a spreadsheet application, a database application, an internet browser application, a website, and a web-based application.

The Biometric Template can be a multi-dimensional array of data corresponding to the acquired biometric modality.

The Biometric-Hash File of the user can be generated by combining biometric data that is based on a biometric modality of a user acquired at a second time prior to the first time with a second instance of the User Encryption Key which is randomly generated prior to generating the first instance of a User Encryption Key in step (d).

Step (b) can further include deleting the biometric data from the first computer memory.

Step (c) can further include deleting the biometric template from the first computer memory.

Lastly, step (f) can further include deleting the first instance of the User Encryption Key and the User Credential File from the second computer.

BRIEF DESCRIPTION OF THE DRAWINGS

FIGS. 1A-1C are a functional block diagram showing three major groups of components, namely, an identity authorization and exchange hub, an administrator computer system, and a user computer system, which are utilized in various ways to practice the various embodiments of the invention disclosed herein;

FIGS. 2A-2D are a flow chart of a first embodiment of the present invention; and FIGS. 3A-3D are a flow chart of a second embodiment of the present invention.

DETAILED DESCRIPTION OF THE INVENTION

The present invention will be described with reference to the accompanying figures where like reference numbers correspond to like elements.

Functional Component Description

Figure 1A:
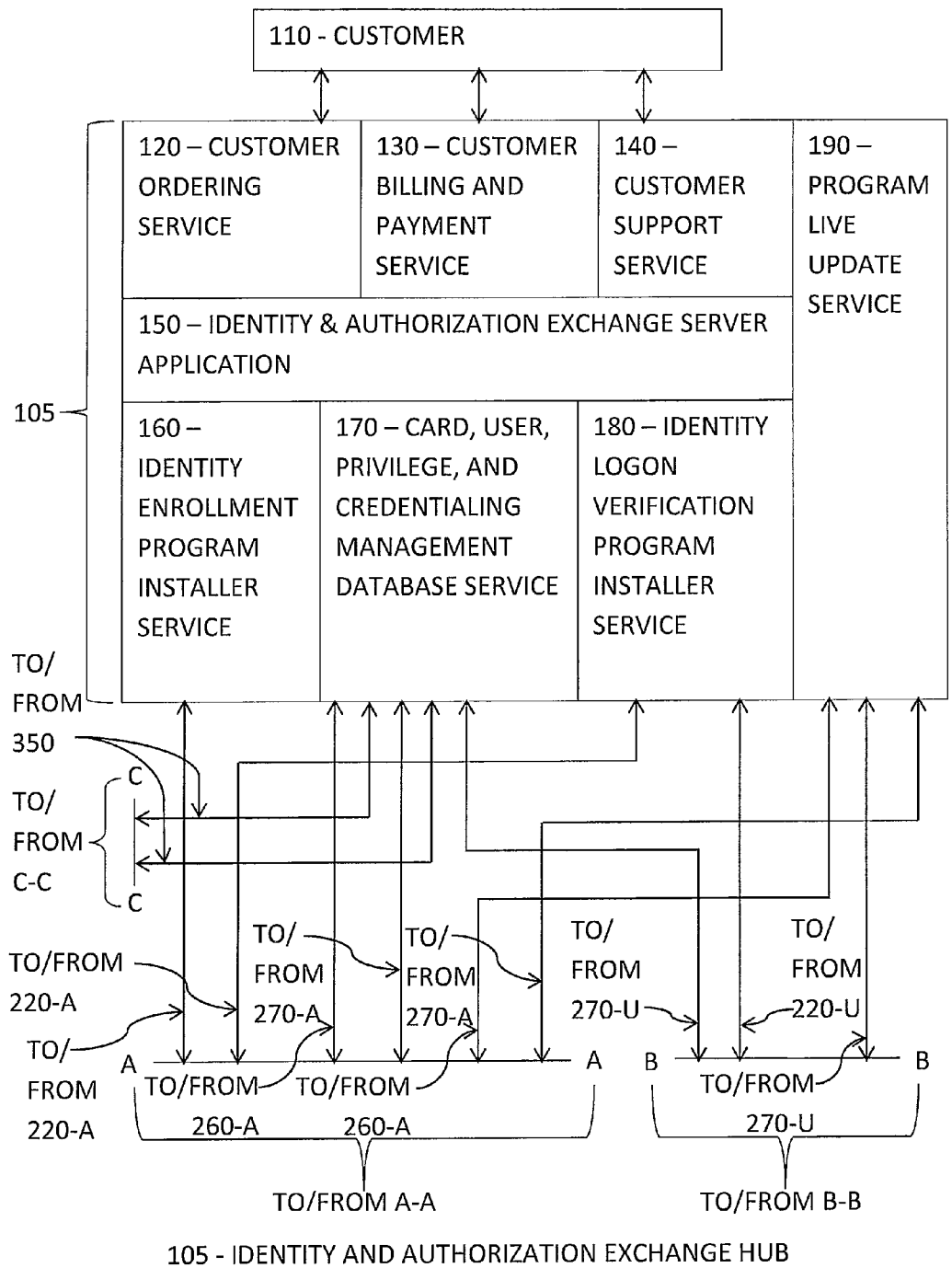
Figure 1C:
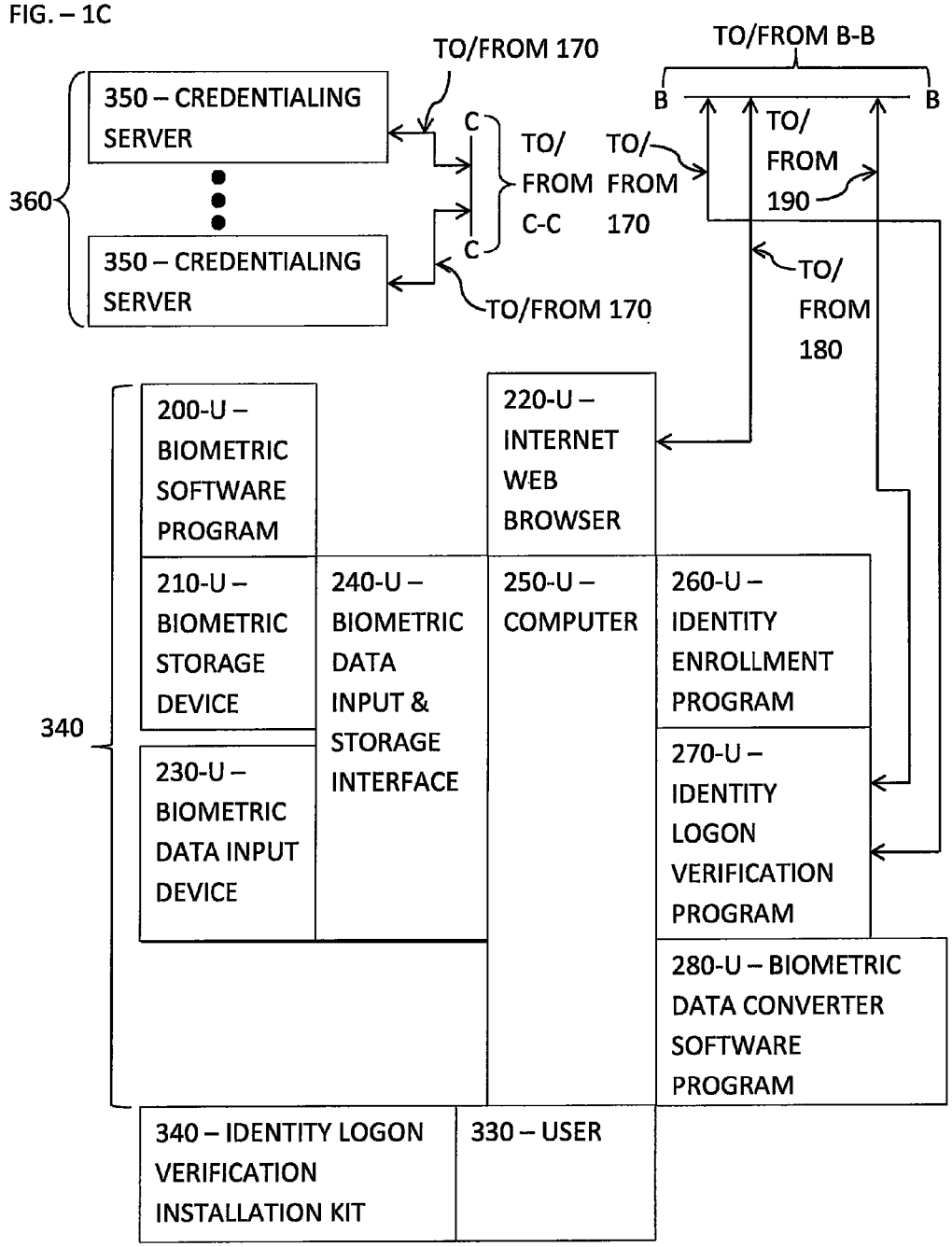
Figure 3D:
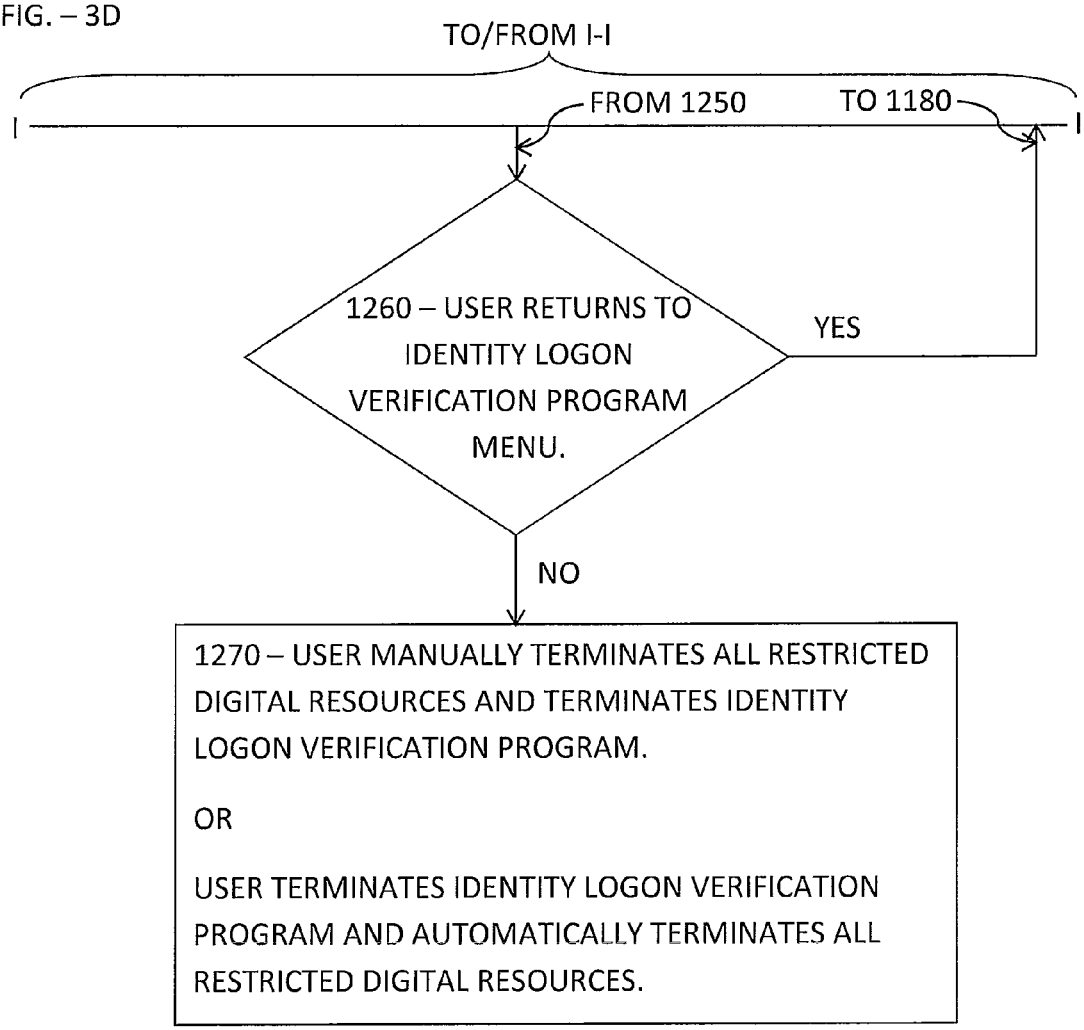

Referring to FIGS. 1A-1C, the functional block diagram shows three major groups of components, designated as the Identity and Authorization Exchange Hub 105 (hereinafter "Hub 105"), the Administrator Computer System 310, and the User Computer System 340. Each of these three major component groups is fundamentally comprised of a general-purpose computer comprised of at least one processing element, typically a central processing unit (CPU), and some form of memory, whose size and capabilities make it useful for operating the specialized software programs described herein, and is able to interface with peripheral devices that allow information to be retrieved from an external source. Each group is comprised of machine and software components. These components are connected to each other using various human-to-machine, machine-to-machine, and software-to-machine interfaces. Examples of suitable computers include, but are not limited to, a desktop computer, a laptop computer, a notebook computer, a tablet computer, a held-hand computer, a mobile phone, or a smart phone device, etc.

Hub 105 is a network server, which is a computer designed to process requests and deliver data to other (client) computers over a computer network. Hub 105 hosts multiple services used in this invention including, but is not limited to, a Customer Ordering Service 120; a Customer Billing and Payment Service 130; a Customer Support Service 140; an Identity and Authorization Exchange Server Application 150; an Identity Enrollment Program Installer Service 160; a Card, User, Privilege, and Credentialing Management Database Service 170; an Identity Logon Verification Program Installer Service 180; and Program Live Update Service 190.

The Administrator Computer System 310 and the User Computer System 340 are human interface devices (HID), which are computers designed to provide people with a human-to-machine means of exchanging information, and are able to interface with peripheral devices that allow information to be retrieved from an external source including, but is not limited to, cameras, scanners, touch screens, microphones, smart card readers, or external memory devices (e.g., USB memory stick), etc.

These major component groups (105, 310, and 340) are connected to each other via a computer network. The computer network can be as small as a local area network or as large as the Internet. Each solid lined arrow that runs from one element to another element in FIG. 1 represents a computer network or internet communication channel. Information communicated through each network or internet channel can be secured by a cryptographic communications protocol such as, but not limited to, the Transport Security Layer or the Secure Socket Layer of the Open Systems Interconnection (OSI) model.

A Customer 110 can be any type of group (e.g., business entities) or an individual desiring to fully automate biometric identity assurance, privilege and credential management, and access control services, whether using the secure identification system in its entirety or specific individual components only. Customer 110 can order products and services from a Customer Ordering Service 120; set up, configure and automatically execute payment transactions from a Customer Billing and Payment Service 130; and access product and service support from a Customer Support Service 140. An Administrator 290 and the User 330 are members or a subset of the Customer 110.

Customer Ordering Service 120 provides the capability to Customer 110 to determine their specific order requirements, to place their order for an Identity Enrollment Installation Kit 300, an Identity Logon Verification Installation Kit 340, and a Credentialing Management Database Service 170, to pay for their order, and to receive the necessary information, hardware, and instructions to initiate their implementation of services via an Internet browser.

Customer Billing and Payment Service 130 provides the capability to extract information from Credentialing Management Database Service 170 in order to generate and send periodical customer billing information to Customer 110 and to collect and record periodical payments from Customer 110.

Customer Support Service 140 provides a help desk function for a User 330 and Administrator 290. The help desk function includes, but is not limited to, trouble-shooting software and hardware issues, training, and billing and account issues.

Identity and Authorization Exchange Server Application 150 manages and coordinates the activities of Customer Ordering Service 120, Customer Billing and Payment Service 130, Customer Support Service 140, Identity Enrollment Program Installer Service 160, Credentialing Management Database Service 170, Identity Logon Verification Program Installer Service 180, and Program Live Update Service 190 in order to effectively provide fully automated biometric identity assurance, privilege and credential management, and access control services.

Hereinafter, the suffix "A" following a reference number, e.g., 250-A, indicates that the referenced element is associated with Administrator Computer System 310. Similarly, except as is expressly described herein, the suffix "U" following a reference number, e.g., 250-U, indicates that the referenced element is associated with User Computer System 340.

Identity Enrollment Program Installer Service 160 provides the capability for Administrator 290 of the Customer 110 to transfer copies of an Identity Enrollment Program 260-A, an Identity Logon Verification Program 270-A, and a Biometric Data Converter Software 280-A from Hub 105 to Administrative Computer System 310 using an Internet Web Browser 220-A; and to activate and configure Credentialing Management Database Service 170. Credentialing Management Database Service 170 manages Customer 110 information used to implement the automated biometric identity assurance, privilege and credential management, and access control services on Hub 105. Customer 110 information includes, for each User 380, but is not limited to, name user identification number, job title, employment status, authorized access list of restricted digital resources, and required credentialing information. A subset of Customer 110 information is a credential file for each User 330. Each User credential file is a digital record of the User 330 credentials used to gain access to the User 330 Restricted Digital Resources, which includes, but is not limited to, user names, passwords, and personal identification numbers.

Credentialing Management Database Service 170 can store Customer 110 information on Hub 105 as a Customer 110 database. However, Credentialing Management Database Service 170 can store each User credential file on either Hub 105, or disassemble and distribute the file to multiple Credentialing Servers 350 for more secure storage. Credentialing Management Database Service 170, when requested, can retrieve and re-assemble each individual User Credential File stored on multiple Credentialing Servers 350. In either storage location (Hub 150 or multiple Credentialing Servers 350), each User Credential File is stored as an encrypted file.

Credentialing Management Database Service 170 can be accessed using a network or Internet connection using a secure cryptographic communications protocol by Identity Enrollment Programs 260-A and 260-U and Identity Logon Verification Programs 270-A and 270-U. The Customer 110 database stored on Credentialing Management Database Service 170 is also configurable by the Administrator 290 using the Identity Enrollment Program 260-A.

The Identity Logon Verification Program Installer Service 180 provides the capability for Administrator 290 to transfer copies of the Identity Logon Verification Programs 270-A and 270-U, and the Biometric Data Converter Software 280-A and 280-U to Computers 250-A and 250-U from Hub 105, using Internet Web Browser 220-A and 220-U.

Program Live Update Service 190 provides the capability to each of Administrator 290 and User 330 to manually or automatically update the Identity Enrollment Programs 260-A and 260-U or the Identity Logon Verification Programs 270-A and 270-U on Computers 250-A and 250-U through the computer network.

The Biometric Software Programs 200-A and 200-U are software applications residing on Biometric Storage Devices 210-A and 210-U of Administrator Computer System 310 and User Computer System 340, respectively. These applications can re-generate a User Encryption Key used to encrypt the User Credential File of each User 330 by merging a Biometric Template with a Biometric-Hash File stored on Biometric Storage Devices 210-A and 210-U. Also or alternatively, a Biometric Software Program 200-S can reside and operate on Hub 105.

The Biometric Storage Devices 210-A and 210-U provide the capability of storing a Biometric-Hash File and executing the Biometric Software Programs 200-A and 200-U, and are each comprised of at least one processing element, and some form of memory (RAM, ROM, etc.). The Biometric Storage Devices 210-A and 210-U can be, but are not limited to, smart cards, memory sticks, or thumb drives. Also or alternatively, Biometric Storage Device's 210-A and/or 210-U functionality can be moved to Identity and Authorization Exchange Hub 105 by storing the corresponding Biometric-Hash File in Hub's 105 internal memory.

Internet Web Browsers 220-A and 220-U are software applications for retrieving, presenting, and transferring informational resources on the Internet, World Wide Web, private network servers, and file systems. These software applications reside and run on Computers 250-A and 250-U and provide the capability to access Hub 105 in order to access and use its services.

Biometric Data Input Devices 230-A and 230-U provide the capability to capture and record in a biometric data file unique biometric modalities of Administrator 290 and User 330 such as, but not limited to, face, fingerprint, hand geometry, iris, signature, vascular, and voice. The biometric data file recorded by Devices 230-A and 230-U are sent to corresponding Biometric Data Converter Software 280-A and 280-U to be analyzed and converted into a compressed file format, i.e., a Biometric Template.

Biometric Data Input & Storage Interfaces 240-A and 240-U provide the capability to allow Biometric Software Programs 200-A and 200-U, Biometric Storage Devices 210-A and 210-U, Biometric Data Input Devices 230-A and 230-U to communicate with Identity Enrollment Programs 260-A and 260-U, Identity Logon Verification Programs 270-A and 270-U, and/or Biometric Data Converter Software 280-A and 280-U running on Computers 250-A and 250-U, respectively. Biometric Data Input & Storage Interfaces 240-A and 240-U and Biometric Data Input Devices 230-A and 230-U, respectively, can be integrated into a single physical device.

Each Computer 250-A and 250-U can be a general-purpose computer comprised of at least one processing element, such as a central processing unit (CPU), and memory (RAM, ROM, and/or any other suitable and/or desirable computer memory known in the art), whose size and capabilities make it useful for Administrator 290 and/or User 330, and are intended to be operated directly by Administrator 290 or User 330 with no intervening computer operator. Peripheral devices allow information to be retrieved from one or more external sources, and the result of operations saved and retrieved. Examples of Computers 250-A and 250-U include, but are not limited to, desktop computers, laptop computers, notebook computers, tablet computers, hand-held computers, mobile phones, or smart phone devices, etc.

Identity Enrollment Programs 260-A and 260-U provide the capability to configure and manage Credentialing Management Database Service 170, to add and enroll new Users 330 or new Administrators 290 into the database stored on Credentialing Management Database Service 170, to modify and change existing information in the database, to create and issue new Biometric Storage Devices 210-A and 210-U, and/or modify or change existing Biometric Storage Devices 210-A and 210-U. Identity Enrollment Programs 260-A and 260-U also provide the capability to manage the collection and conversion of raw biometric data, and transfer Biometric-Hash Files to Biometric Storage Devices 210-A and 210-U. Identity Enrollment Programs 260-A and 260-U also provide the capability to generate audit reports on User 330 and Administrator 290 activities, such as, but not limited to, log in times, Computers 250-A and 250-U identities, privileges and credentials accessed, and log off times.

Identity Logon Verification Programs 270-A and 270-U are operative for requesting Administrator 290 and User 330 to provide their respective Biometric Modalities to Biometric Data Input Devices 230-A and 230-U, respectively. The collected Biometric Modalities are submitted to the Biometric Data Converter Software Programs 280-A and 280-U where the collected Biometric Modalities are converted into Biometric Templates for Administrator 290 and User 330, respectively. These Biometric Templates are then stored in Biometric Storage Devices 210-A and 210-U where Biometric Software Programs 200-A and 200-U can re-generate the User Encryption Keys by merging the Biometric Templates with the stored Biometric-Hash Files, respectively.

Identity Logon Verification Programs 270-A and 270-U send requests to Credentialing Management Database Service 170 to retrieve the User 330 Credential Files. Once received, Identity Logon Verification Programs 270-A and 270-U decrypt the User 330 Credential Files using the User Encryption Keys, and presents the Administrator 290 and User 330 credentials to the Restricted Digital Resource software to activate access.

Biometric Data Conversion Software Programs 280-A and 280-U can convert Biometric Data collected from Biometric Data Input Devices 230-A and 230-U into Biometric Templates that can be used to generate Administrator 290 and/or User 330 Biometric-Hash File(s) during the registration process or re-generate the Encryption Key during the authorized access process.

Administrator 290 is responsible for the maintenance of computer hardware and software of Customer 110 that comprises a computer network. This normally includes deploying, configuring, maintaining, and monitoring active network equipment.

Identity Enrollment Installation Kit 300 includes the necessary information, hardware, and software to set up Administrator 290, Administrator Computer System 310 in order to initialize the fully automated biometric identity assurance, privilege and credential management, and access control services at the Customer 110 facility.

The User 330 is an individual whom Administrator 290 enrolls into the secure identification system which provides the biometric identity assurance, privilege and credential management, and access control services.

Identity Logon Verification Installation Kit 345 includes the necessary information, hardware, and software to set up User Computer System 340 in order to implement the fully automated biometric identity assurance, privilege and credential management, and access control services.

Each Credentialing Server 350 is a network server used by Credentialing Management Database Service 170 to store portions of a User Credential File.

Credentialing Server 360 is a collection of multiple Credentialing Servers 350 used by Credentialing Management Database Service 170 to store different portions of the User Credential File at different Credentialing Servers 350.

Functional Description

The fully automated biometric identity assurance, privilege and credential management, and access control services (Identity Services) are implemented from Hub 105 running multiple service and application software programs. These services or applications include, but are not limited to, Customer Ordering Service 120; Customer Billing and Payment Service 130; Customer Support Service 140; Identity and Authorization Exchange Server Application 150; Identity Enrollment Program Installer Server 160; Credentialing Management Database Service 170; Identity Logon Verification Program Installer Service 180, and Program Live Update Service 190.

Customer 110 can fully access these services and applications from the Internet after the delivery of required hardware components of the secure identification system. The Identity Services are implemented by converting a User 330 unique Biometric Modality (e.g., fingerprint) into a Biometric Template that can be used either to generate a Biometric-Hash File which is stored on Biometric Storage Device 210-U, (e.g., smart card) or used to re-generate the User Encryption Key from the Biometric-Hash File. The User 330 identity is verified if the correct User Encryption Key is re-generated that allows for granting access to User 330 Restricted Digital Resources. Access control is governed by Credentialing Management Database Service 170 which includes the User 330 personal information, the User 330 credentials and permissions, and the Restricted Digital Resources authorized for use by the customer Administrator 290. Administrator 290 can manage and change the User 330 privileges and credentials in real time by accessing the specific customer database, which is accessed every time an individual attempts to access the Restricted Digital Resources.

A smart card is used as an example of each Biometric Storage Device 210-A and 210-U; and an integrated smart card reader and fingerprint scanner device is an example of each Biometric Data Input Devices 230-A and 230-U, and Biometric Data Input & Storage Interfaces 240-A and 240-U combined into respective single physical device, e.g., one device includes Biometric Data Input Device 230-A and Biometric Data Input & Storage Interface 240-A, and another device includes Biometric Data Input Device 230-U and Biometric Data Input & Storage Interface 240-U. The following paragraphs describe the process to implement the secure identity system and how the overall system operates.

After Customer 110 places an order for the Identity Services, Administrator 290 of Customer 110 receives the Identity Enrollment Installation Kit 300 as ordered by Customer 110 from Hub 105 using the Customer Ordering Service 120. This kit contains at least two integrated smart card reader and fingerprint scanner devices 230-A and 230-U with their own device driver software, one generic administration smart card 210-A, one set of instructions, and any number of blank smart cards 210-U ordered. Administrator 290 connects the two scanner devices 230-A and 230-U to Computer 250-A via two interface ports (e.g., USB ports) and installs the scanner device drivers on computer 250-A as necessary.

Administrator 290, via Computer 250-A and Internet Web Browser 220-A, connects to Hub 105, logs into a new customer enrollment page at Hub 105, inserts generic administrator smart card 210-A into smart card reader and scanner device 230-A as requested, and initiates Identity Enrollment Program Installer Service 160 residing on Hub 105 to download to Administrator Computer System 310 from Hub 105 Identity Enrollment Program 260-A, Identity Logon Verification Program 270-A, and Biometric Data Converter Unit 280-A for use by Computer 250-A.

Identity Enrollment Program Installer Service 160 creates a customer specific database using Credentialing Management Database Service 170 from information provided by Administrator 290 during an initial enrollment process. This database is hosted on Hub 105 and is accessible by Identity Enrollment Program 260-A or 260-U and Identity Logon Verification Program 270-A or 260-U running on computers 250-A and 250-U, respectively.

Administrator 290 removes and re-inserts the generic administrator smart card 210-A from and to scanner device 230-A to launch Identity Logon Verification Program 270-A and Identity Enrollment Program 260-A via Identity Enrollment Program 260-A. Administrator 290 enrolls himself to create a unique smart card 210-U with the Administrator 290 stored Biometric-Hash File by inserting a blank smart card 210-U into the second connected card reader and scanner device 230-U. Administrator 290 can further configure the customer specific database as necessary before creating smart card 210-U for the first User 330.

To enroll each User 330 and create a unique smart card 210-U for said User 330, the Administrator 290 inserts smart card 210-A, including Administrator 290 enrollment privilege and credential, into the first device 210-A attached to Computer 250-A, and provides his unique Biometric Modality to activate Identity Enrollment Program 260-A. After selecting the add new user option of Identity Enrollment Program 260-A, Administrator 290 inserts a blank smart card 210-U into the second device 230-U attached to Computer 250-A, enters the new User 330 information including, but not limited to, his permitted privileges and credentials.

Next, via Identity Enrollment Program 260-A, Administrator 290 collects the required Biometric Data from User 330 to create a Biometric Template for the User, which is merged with a randomly generated User Encryption Key to generate a Biometric-Hash File for the User which is stored on the smart card 210-U. The User Encryption Key is used to encrypt a User Credential File which is stored either on Hub 105 or across multiple Credentialing Servers 350. This process is repeated for every new User 330 enrolled.

Next, Administrator 290 disconnects smart card reader and scanner device 230-U from Computer 250-A, connects smart card reader and scanner device 230-U to the Computer 250-U, and installs device drivers on Computer 250-A as necessary.

Via User Computer 250-U and Internet Web Browser 220-U, administrator 290 securely connects to Hub 105 and initiates Identity Logon Verification Program Installer Service 180 to download Identity Logon Verification Program 270-U and Biometric Data Converter Software 280-U into Computer 250-U.

Next, User 330 inserts his enrolled smart card 210-U into device 230-U to activate Identity Logon Verification Program 270-U on Computer 250-U to activate User's unique privileges and credentials as stored in the User specific database for User 330 hosted by Credentialing Management Database Service 170 on Hub 105, or stored across multiple Credentialing Servers 350 and re-assembled by Credentialing Management Database Service 170.

Administrator 290 via Identity Enrollment Program 260-A can change the information in User 330 customer specific database in real-time and expect the changes to be implemented on the next User 330 access transaction.

Program Live Update Service 190 can manually or automatically update Identity Enrollment Programs 260-A and 260-U and Identity Logon Verification Programs 270-A and 270-U from Hub 105.

Customer Billing and Payment Service 130 provides a monthly service usage report, a monthly billing statement, and automatic payment method for Customer 110.

First Embodiment Flow Chart

Smart Card Stored Biometric with Credentials Stored on Multiple Servers

Referring now to the flow diagram shown in. FIGS. 2A-2D and with continuing reference to FIGS. 1A-1C, at 510, User 330 launches Identity Logon Verification Program 270-U by inserting his unique pre-configured smart card 210-U into Biometric Data Input Device 230-U. Each smart card 210 includes an embedded microchip that can store programs and data and execute the stored programs, such as the User's Biometric-Hash File and Biometric Software Program 200-U, in the form of a smart card reader Identity Logon Verification Program 270-U provides an extremely strong and secure sign-on function by requiring User 330 to provide one or multiple biometric modalities and distributing User 330 credentials among credentialing servers 350 interconnected by a communication network using a secure cryptographic communications protocol.

At 520, Identity Logon Verification Program 270-U responds to the insertion of smart card 210-U into Biometric Data Input Device 230-U by providing a graphical user interface on a display of computer 250-U requesting User 330 to enter one or more Biometric Modalities (depending on the Administrator 290 requirements) using Biometric Data Input Device 230-U. Computer 250-U converts the entered one or more Biometric Modalities into User's 350 Biometric Data.

Depending on Computer 250-U, capabilities or additional biometric capturing devices attached, these Biometric Modalities can include, but are not limited to, face, fingerprint, hand geometry, iris, signature, vascular, and voice. Identity Logon Verification Program 270-U does not permanently store or save the User 330 Biometric Data on the Computer 250-U, smart card reader 230-U, or smart card 210-U.

At 530, Identity Logon Verification Program 270-U determines if the User 330 Biometric Data was successfully captured and temporarily stores this Biometric Data on Computer 250-U internal memory.

At 540, if the User 330 Biometric Data was not successfully captured in step 530, Identity Logon Verification Program 270-U will make additional request to User 330 to re-submit his Biometric Modalities. Identity Logon Verification Program 270-U is pre-configured to make this request n-number of times before reporting User 330 failure to the Administrator 290 and automatically disabling User 330 ability to use Identity Logon Verification Program 270-U until intervention by Administrator 290.

At 550, Identity Logon Verification Program 270-U determines if the additional request exceeds the counter or not. If not, flow returns to step 520. Otherwise, flow advances to step 570 where Identity Logon Verification Program 270-U sends an event log to Hub 105 and terminates User 330 session.

If, in step 530, the User 330 Biometric Data was successfully captured and stored, at 560, Biometric Data Converter Software Program 280-U converts the captured User 330 Biometric Data into User 330 Biometric Template, temporarily stores the User 330 Biometric Template in Computer 250-U internal memory, and deletes the User's Biometric Data from Computer 250-U internal memory.

At 580, Identity Logon Verification Program 270-U sends the Biometric Template to the Biometric Software Program 200-U that resides on smart card 210-U and sends a request for the User Credential File of User 330 to Hub 105.

At 590, Identity Logon Verification Program 270-U deletes the User 330 Biometric Template from Computer 250-U internal memory, whereupon the User Biometric Template now only resides on smart card 210-U.

At 600, Biometric Software Program 200-U merges the Biometric Template residing on smart card 210-U with the Biometric-Hash File previously stored on smart card 210-U to re-generate the User Encryption Key that was used to initially encrypt the User Credential File for the User's Restricted Digital Resources.

By way of background, the User's Biometric-Hash File stored on smart card 210-U is generated by combining the User 330 Biometric Template with User Encryption Key during User 330 registration. The User Encryption Key is randomly generated by Computer 250-U when the User's Restricted Digital Resource credentials are registered and configured by Hub 105. Recall that Restricted Digital Resources are digital resources that have access controls where a User must provide and present their credentials to be granted permission to use or access the resource.

At 610, Hub 105, in response to a request for the User Credential File by Identity Logon Verification Program 270-U, assembles the previously distributed, encrypted user credential files from multiple Credentialing Servers 350 into a single, encrypted User Credential File. The User Credential File is the complete collection of credentials used by User 330 to access his complete set of Restricted Digital Resources. Recall that User Credentials are data that the User must know or have in order to be granted permission to access the User's Restricted Digital Resource(s) and can include, but is not limited to, user name, password, personal identification numbers, face, fingerprint, hand geometry, iris, signature, vascular, and voice, etc.

At 630, Biometric Software Program 200-U residing on smart card 210-U sends the encrypted User Encryption Key re-generated in step 600 to Identity Logon Verification Program 270-U.

At 640, the encrypted User Credential File re-generated in step 610 is sent from Hub 105 to Identity Logon Verification Program 270-U.

At 650, Biometric Software Program 200-U running on smart card 210-U deletes the Biometric Template and the User Encryption Key from smart card 210-U.

At 660, Identity Logon Verification Program 270-U using the User Encryption Key decrypts the User Credential File to obtain the User's credentials and presents the User's credentials to one or more of the User's requested Restricted Digital Resource to gain access or retrieve the same.

At 670, the User Credential Files, partial and complete, are deleted from the memory of the network server hosting Hub 105.

At 680, Identity Logon Verification Program 270-U presents a menu to User 330 listing the complete list of Restricted Digital Resources, and User 330 selects a desired Restricted Digital Resource.

At 690, in response to User 330 selecting the desired Restricted Digital Resource, Identity Logon Verification Program 270-U activates the selected Restricted Digital Resource and enters the User 330 credentials in order to gain access to said Restricted Digital Resource. The activation process implemented and executed by the Identity Logon Verification Program 270-U includes, but is not limited to: launching the Internet Web Browser 220-U, entering the Restricted Digital Resource URL address, navigating to the logon webpage, and entering the User 330 user name, password or personal identification number; or launching the application, and entering the User 330 user name, password or personal identification number.

At 700, if access is not granted to the selected Restricted Digital Resource because the correct User Encryption Key was not generated, then the Biometric Software Program 200-U is directed to request the User 330 Biometric Modalities again up to x-times.

At 705, if the Identity Logon Verification Program 270 fails to grant access to a User 330 Restricted Digital Resource, the Identity Logon Verification Program 270-U will make additional requests to the User 330 to re-submit his Biometric Modalities. The Identity Logon Verification Program 270-U is pre-configured to make this request x-number of times before reporting the User 330 failure to the Administrator 290 and automatically disabling the User 330 ability to use the Identity Logon Verification Program 270-U until intervention by the Administrator 290.

At 710, the Identity Logon Verification Program 270-U attempts to access or logon to the User 330 desired Restricted Digital Resource, and records if the access was successful or not.

At 720, if the decrypted User Credentials fail to grant access to the User 330 Restricted Digital Resource after x-times, then the Identity Logon Verification Program 270-U sends an event log to Hub 105, which notifies the Administrator 290 of the failure and terminates the session.

At 730, if the decrypted User Credentials succeed in granting access to the User Restricted Digital Resource, then the Identity Logon Verification Program 270-U sends an event log to Hub 105.

At 740, the Identity Logon Verification Program 270-U pauses, while the User 330 uses his Restricted Digital Resource.

At 750, after using the Restricted Digital Resource, the User 330 decides to terminate or pause use of the Restricted Digital Resource.

At 760, the User 330 decides to return to the Identity Logon Verification Program 270-U menu to activate another Restricted Digital Resource or not. If not, flow returns to step 680. Otherwise, flow advances to step 770.

At 770, the User 330 decides to either manually terminate the Restricted Digital Resources (e.g., log-off) and removes the smart card 210-U from the smart card reader 230-U to terminate the Identity Logon Verification Program 270-U, or removes the smart card 210-U from the smart card reader 230-U to terminate the Identity Logon Verification Program 270-U and automatically terminates access to the Restricted Digital Resources.

Second Embodiment Flow Chart

Server Stored Biometric with Credentials Stored on Multiple Servers

The second embodiment differs from the first embodiment by the absence or removal of the Biometric Storage Devices 210-A and 210-U including the internally stored Biometric-Hash File and Biometric Software Programs 200-A and 200-U, and the addition of Biometric Software Program 200-S residing and operating on Hub 105.

Referring to FIGS. 3A-3D and with ongoing reference to FIGS. 1A-1C, at 1010, User 330 operates Computer 250-U to launch Identity Logon Verification Program 270-U by either clicking on an associated screen icon displayed on a display of Computer 250-U that is linked to the software executable file or other means to activate the software executable file.

Identity Logon Verification Program 270-U provides an extremely strong and secure sign-on function by requiring User 330 to provide one or more biometric modalities and distributing User 330 credentials among multiple credentialing servers 350 interconnected by a communication network using a secure cryptographic communications protocol.

At 1020, in response to step 1010, Identity Logon Verification Program 270-U provides a graphical user interface on Computer 250-U requesting User 330 to submit one or multiple Biometric Modalities (depending on the Administrator 290 requirements) using the Biometric Data Input Device 230-U.

Depending on Computer 250-U, capabilities or additional biometric capturing devices attached, these Biometric Modalities can include, but are not limited to, face, fingerprint, hand geometry, iris, signature, vascular, and/or voice. Identity Logon Verification Program 270-U does not permanently store or save User 330 Biometric Data on Computer 250-U. Computer 250-U converts the entered Biometric Modality or Modalities into User 330 Biometric Data.

At 1030, Identity Logon Verification Program 270-U determines if the User 330 Biometric Data was successfully captured and temporarily stores the User's Biometric Data on Computer 250-U internal memory.

At 1040, if User 330 Biometric Data was not successfully captured, Identity Logon Verification Program 270-U will make additional requests to User 330 to re-submit his one or more Biometric Modalities. Identity Logon Verification Program 270-U is pre-configured to make this request n-number of times before reporting User 330 failure to the Administrator 290 and automatically disabling User 330 ability to use Identity Logon Verification Program 270-U until intervention by Administrator 290.

At 1050, Identity Logon Verification Program 270-U determines if the additional request exceeds the counter or not. If not, flow returns to step 1020. Otherwise, flow advances to step 1070 where Identity Logon Verification Program 270-U sends the event log to Hub 105 and terminates User 330 session.

If, in step 1030, the User's 300 Biometric Data was successfully captured and stored, at 1060, Biometric Data Converter Software Program 280-U converts the captured User's Biometric Data into a User's Biometric Template, temporarily stores the User's Biometric Template in Computer 250-U internal memory, and deletes the Biometric Data from the Computer 250-U internal memory.

At 1080, Identity Logon Verification Program 270-U sends the User's Biometric Template to Biometric Software Program 200-S on Hub 105 and sends a request for the User Credential File to Hub 105. Recall in this second embodiment that Biometric Software Programs 200-A and 200-U and Biometric-Hash Files stored on Biometric Storage Devices 210-U and 210-A in the first embodiment, have been relocated in this second embodiment to Hub 105, and that Biometric Storage Devices 210-A and 210-U are no longer part of Administrator Computer System 310 and User Computer System 340.

At 1090, Identity Logon Verification Program 270-U deletes the User's Biometric Template from Computer 250-U internal memory.

At 1100, Biometric Software Program 200-S merges the User's Biometric Template from Identity Logon Verification Program 270-U with the User's Biometric-Hash File previously stored on Hub 105 to re-generate the User Encryption Key used to encrypt the User Credential File for Restricted Digital Resources.

In this embodiment, the User's Biometric-Hash File is generated by combining the User 330 Biometric Template with the User's Encryption Key during the User 330 registration process. The same User Biometric Modality or Modalities are utilized to create the User's Biometric Templates during User registration and when the User wishes to access the User's Restricted Digital Resource(s). The User's Encryption Key is randomly generated by computer 250-U when User's Restricted Digital Resource credentials are registered and configured by Hub 105.

At 1110, Hub 105, in response to a request for the User Credential File by Identity Logon Verification Program 270-U, assembles the previously distributed, encrypted User Credential File from multiple Credentialing Servers 350 into a single, encrypted User Credential File. The User Credential File is the complete collection of credentials used by the User 330 to access his complete set of Restricted Digital Resources.

At 1130, the Biometric Software Program 200-S sends the User Encryption Key re-generated in step 1100 to the Identity Logon Verification Program 270-U.

At 1140, the encrypted User Credential File re-generated in step 1110 is sent from Hub 105 to the Identity Logon Verification Program 270-U.

At 1150, the Biometric Template and User Encryption Key are deleted from Hub 105 memory.

At 1160, the Identity Logon Verification Program 270-U using the User Encryption Key decrypts the User Credential File for his Restricted Digital Resources and presents the User's credentials to one or more of the User's requested Restricted Digital Resource to gain access or retrieve the same.

At 1170, the User Credential Files, partial and complete, are deleted from the memory of the network server hosting Hub 105.

At 1180, Identity Logon Verification Program 270-U presents a menu to User 330 listing the complete list of Restricted Digital Resources, and User 330 selects a desired Restricted Digital Resource.

At 1190, in response to selecting the desired Restricted Digital Resource Identity Logon Verification Program 270-U activates the selected Restricted Digital Resource and enters the User 330 credentials in order to gain access to said Restricted Digital Resource. The activation process implemented and executed by the Identity Logon Verification Program 270-U includes, but is not limited to: launching Internet Web Browser 220-U, entering the Restricted Digital Resource URL address, navigating to the logon webpage, and entering the User 330 user name, password or personal identification number; or launching the application, and entering the User 330 user name, password or personal identification number.

At 1200, if access is not granted to the selected Restricted Digital Resource because the correct User Encryption Key was not generated, then the Identity Logon Verification Program 270-U is directed to request the User 330 Biometric Modalities again up to x-times.

At 1205, if the Identity Logon Verification Program 270-U fails to grant access to a User 330 Restricted Digital Resource, the Identity Logon Verification Program 270-U will make additional requests to the User 330 to re-submit his Biometric Modalities. The Identity Logon Verification Program 270-U is pre-configured to make this request x-number of times before reporting the User 330 failure to the Administrator 290 and automatically disabling the User 330 ability to use the Identity Logon Verification Program 270-U until intervention by the Administrator 290.

At 1210, the Identity Logon Verification Program 270-U attempts to access or logon to the User 330 desired Restricted Digital Resource, and records if the access was successful or not.

At 1220, if the decrypted User Credentials fail to grant access to the User 330 Restricted Digital Resource after x-times, then the Identity Logon Verification Program 270-U sends an event log to Hub 105, which notifies the Administrator 290 of the failure and terminates the session.

At 1230, if the decrypted User Credentials succeed in granting access to the User Restricted Digital Resource, then the Identity Logon Verification Program 270-U sends an event log to Hub 105.

At 1240, the Identity Logon Verification Program 270-U pauses, while the User 330 uses his Restricted Digital Resource.

At 1250, after using the Restricted Digital Resource, the User 330 decides to terminate or pause use of the Restricted Digital Resource.

At 1260, the User 330 decides to return to the Identity Logon Verification Program 270-U menu to activate another Restricted Digital Resource or not. If not, flow returns to step 1180. Otherwise, flow advances to step 1270.

At 1270, the User 330 decides to either (1) manually terminate the Restricted Digital Resources (e.g., log-off) and terminates the Identity Logon Verification Program 270-U or (2) terminates the Identity Logon Verification Program 270-U, which automatically terminates the Restricted Digital Resources.

The present invention has been described with reference to the accompanying figures. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A method of biometric identity assurance comprising:
   (a) storing in a memory of a first computer biometric data that is based on a biometric modality of a user acquired at a first time;
   (b) converting the biometric data of step (a) into a biometric template stored on the first computer memory;
   (c) receiving the biometric template in a memory of a second computer;
   (d) the second computer determining a first instance of a user encryption key based on a combination of the biometric template with a biometric-hash file of the user;
   (e) assembling multiple credential files that were previously distributed among multiple remote computers into a single user credential file at the second computer, wherein each distributed credential file includes at least one credential of the user and the user credential file includes multiple credentials of the user;
   (f) the first computer receiving the first instance of the user encryption key and the user credential file from the second computer;
   (g) the first computer accessing user credentials stored in the user credential file based on decryption of the user credential file using the first instance of the user encryption key; and
   (h) the first computer using the user credentials accessed in step (g) to use or access one or more digital resources of the user.

2. The method of claim 1, wherein each digital resource includes one of the following: a document file, a spreadsheet file, a picture file, an audio file, a video file, a word processing application, a spreadsheet application, a database application, an internet browser application, a website, and a web-based application.

3. The method of claim 1, wherein the biometric template is a multi-dimensional array of data corresponding to the acquired biometric modality.

4. The method of claim 1, wherein the biometric-hash file of the user is generated by combining biometric data that is based on a biometric modality of a user acquired at a second time prior to the first time with a second instance of the user encryption key which is randomly generated prior to generating the first instance of a user encryption key in step (d).

5. The method of claim 1, wherein:
   step (b) further includes deleting the biometric data from the first computer memory;
   step (c) further includes deleting the biometric template from the first computer memory; and
   step (f) further includes deleting the first instance of the user encryption key and the user credential file from the second computer.

* * * * *